United States Patent [19]

Friess

[11] Patent Number: 4,477,057
[45] Date of Patent: Oct. 16, 1984

[54] SEALING DEVICE FOR VALVES

[75] Inventor: Jean Friess, Clermont En Argonne, France

[73] Assignee: Matkemi AG, Therwil, Switzerland

[21] Appl. No.: 328,645

[22] Filed: Dec. 8, 1981

[30] Foreign Application Priority Data

Dec. 12, 1980 [FR] France .................................. 80 26371

[51] Int. Cl.³ .............................................. F16K 1/22
[52] U.S. Cl. ..................................... 251/306; 277/236
[58] Field of Search ................ 251/305, 306; 277/236, 277/205

[56] References Cited

U.S. PATENT DOCUMENTS

3,250,510 5/1966 Williams ............................... 251/306
4,194,749 3/1980 Bonafous .............................. 251/306
4,247,079 1/1981 Friess ................................... 251/306

Primary Examiner—Martin P. Schwadron
Assistant Examiner—Sheri Novack
Attorney, Agent, or Firm—Young & Thompson

[57] ABSTRACT

The device comprises a main valve-seat of sheet metal having an anchoring flange attached to the valve body and a closure structure which is adapted to cooperate with the valve disk by means of an outer wall forming a curled shell, said closure structure being applied against the convex surface of an auxiliary seat which is in turn applied against the valve body in order to ensure resilient coiling-up of the curled shell when closing the valve, thereby reducing the operating torque of the valve and achieving enhanced leak-tightness in the closed position.

17 Claims, 14 Drawing Figures

FIG_1

FIG_2

FIG_3

FIG_7

FIG_8

FIG_9

FIG_10

FIG_11

FIG_12

FIG_13

FIG_14

SEALING DEVICE FOR VALVES

This invention relates to a sealing device for a valve and especially a butterfly valve, in which provision is made for a main metallic valve-seat having a resilient annular closure structure. This structure has an outer wall of curled sheet metal which is intended to be in contact with the valve closure element or valve disk when this latter is in the closed position. The device further comprises sealing means for ensuring leak-tightness between the main valve-seat and the valve body. In some applications, the valve-closure structure is joined to an anchoring flange which serves to attach the main valve-seat to the valve body.

In a sealing device of this type, different modes of operation of the main valve-seat can be contemplated, depending on the arrangement of said valve seat. In some known valve designs, the closure structure is tightly fitted within a channel formed in the valve body. When the valve disk is moved to the closed position, it has the effect of constricting the cross-section of the valve-closure structure in such a manner as to ensure that an annular contact area of predetermined width exists between the valve disk and the curled sheet-metal member.

In other known valve designs, it is sought on the contrary to subject the curled sheet-metal member to a resilient coiling action when the valve disk is moved to the closed position. Compared with the design mentioned earlier, this mode of deformation entails less friction between the valve seat and the valve disk when this latter is actuated and therefore reduces the operating torque required.

In order to facilitate this coiling action with respect to other modes of deformation which are less desirable, and also in order to eliminate any friction forces which would be liable to increase the operating torque of the valve disk, bearing and guiding surfaces are formed on the valve body for the curled sheet-metal member of the valve-closure structure, at a substantially opposite location with respect to the valve disk when this latter is in the closed position.

In accordance with the teachings of French Pat. No. 2,331,725, provision is made for a concave annular bearing surface having a cross-section substantially in the shape of a quadrant which partially conforms to the profile of the valve-closure structure. In the case of valve seats of this type, a few non-limitative examples of which are given in the above-cited French Pat. No. 2,331,725, the general standard of leak-tightness achieved by these valve seats is excellent, even at high pressure.

However, in spite of the mode of deformation adopted, the torque which is necessary in order to operate the valve when it is subjected to high pressures is of a relatively high order. Furthermore, good operation of the valve in regard to operating torque and leak-tightness is dependent on the temperature to which the valve is subjected. It should be added that, when the valve has been subjected to high pressures, the resultant state of the valve is not always such that it is subsequently capable of ensuring leak-tightness at low pressure.

The aim of the invention is to overcome these disadvantages by providing a sealing device for valves which produces a reduction in operating torque of the valve as well as a degree of leak-tightness which is even further enhanced under all circumstances.

According to the invention, the sealing device for valves is distinguished by the fact that, in order to decrease the torque and to reduce the friction forces generated by the pistol movement of the valve closure element or valve disk, said device further comprises at least one auxiliary valve-seat which makes it possible for the closure structure of the main valve seat to bear on the valve body when the valve element or disk is in the closed position, said auxiliary valve-seat being provided with a convex bearing surface for the curled sheet-metal shell of the valve-closure structure.

This arrangement ensures a substantial reduction in valve operating torque, especially at high pressure. It appears that these good results arise from the fact that the auxiliary valve-seat facilitates rolling-up or coiling of the curled sheet-metal shell while firmly holding the main valve seat in position or in other words preventing it, for example, from bending in the direction opposite to the axis of pivotal displacement of the valve disk. In particular, the auxiliary valve-seat appears to produce an appreciable reduction in friction forces which otherwise prevented the coiling action of the sheet metal shell in French Pat. No. 2,331,725.

These observations are surprising by reason of the fact that, in the state of the technique constituted by the French patent just cited, those versed in the art were taught on the contrary to obtain concave bearing surfaces in order to guide the coiling action of the curled sheet-metal shell of the valve-closure structure.

In an advantageous embodiment of the invention, the auxiliary valve-seat is an annular rib formed on an annular shoulder of the passageway for the flow of fluid.

This particularly economical embodiment endows the valve with greatly enhanced smoothness of operation which is favorable to the installation of remote-control or flow-regulating means.

In another embodiment, the auxiliary valve-seat is an O-ring seal interposed between the valve-closure structure and the valve body.

In this embodiment of the invention, the torque required in order to actuate the valve disk is of very low value, even at high temperature or pressure. Furthermore, the valve disk is tightly applied against its seat in the closed position, irrespective of the temperature or pressure, even if the valve has previously been subjected to very high pressures.

Aside from the coiling action mentioned in the foregoing, the auxiliary valve-seat provides the main valve seat with a resilient support which increases its margin of elastic deformation. The invention therefore permits a combination of effects which are conducive to a very low value of operating torque.

Other features of the invention will be more apparent upon consideration of the following description and accompanying drawings, wherein.

Figures 1, 2, 3:
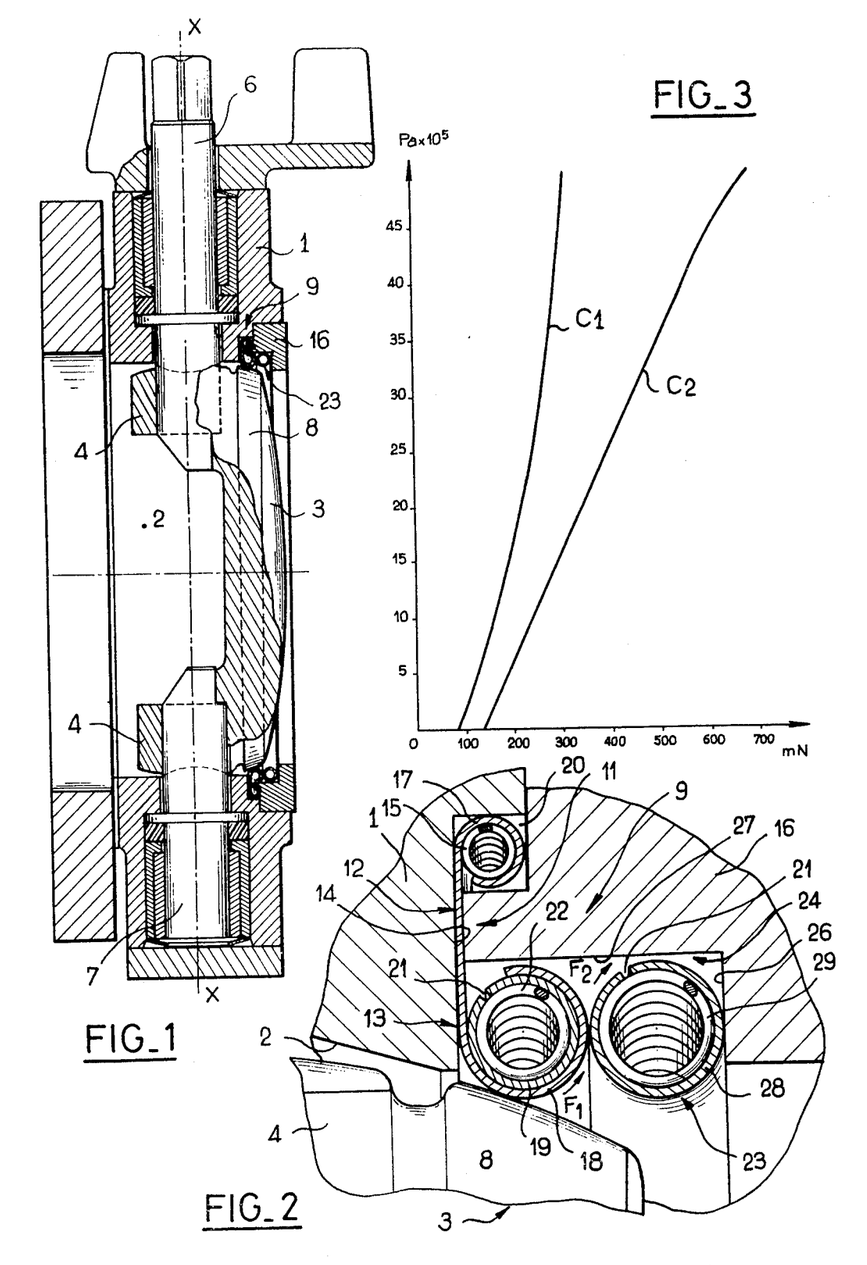
FIG. 1 is a longitudinal sectional view of a butterfly valve equipped with a sealing device according to the invention.
FIG. 2 is a view to a larger scale showing a detail of FIG. 1 and the sealing device in particular.
FIG. 3 is a graph for comparing the torque which is necessary in order to operate the valve with and without application of the invention.

In the example shown in FIG. 1, the butterfly valve comprises a valve body 1 traversed by a passageway 2 having a substantially circular cross-section for the flow of fluid. Within said passageway is mounted a valve closure element or butterfly valve disk 3 which is adapted to carry two diametrically opposite lugs 4. One of said lugs 4 is rotationally coupled to an operating stem 6 which extends outwards from the valve body 1 whilst a stem 7 forming a pivot and rotatably mounted within said valve body 1 is engaged in the other lug 4.

The valve disk 3 is provided on its periphery with a spherical annular zone 8 which is displaced laterally with respect to the common axis X—X of the stems 6 and 7 and which is intended in the closed position of the valve as shown in the figures to cooperate with a sealing device 9 in order to close the passageway 2.

As shown in FIG. 2, the sealing device 9 comprises a main valve-seat 11 having an anchoring flange 12 which is secured to the valve body 1, and a substantially toroidal resilient annular closure structure 13 which projects into the interior of the passageway 2 in order to cooperate with the spherical zone 8 of the valve disk 3.

The anchoring flange 12 has a substantially radial flat portion which is adjacent to the closure structure 13, said flat portion being inserted between an annular shoulder 14 of the valve body 1 and a ring 16 which is screwed in said valve body. At the end remote from the closure structure 13, the anchoring flange 12 is provided with a curled portion 17 housed within an annular cavity 20 defined conjointly by the annular shoulder 14 of the valve body 1 and the ring 16. The curled portion 17 which is applied against three out of the four faces of the rectangular-section cavity 20 ensures leak-tightness between the valve body 1 and the ring 16. A helical spring 15 having a circular axis is fitted within the interior of the curled portion 17 of the anchoring flange 12.

The closure structure 13 consists of a shell 18 or external curl which is rolled outwardly from the anchoring flange 12, that is, in the direction away from the axis X—X. The anchoring flange 12 and the shell 18 form a single-piece component made of resilient sheet metal such as stainless steel. The outer shell 18 corresponds in cross-section to slightly over three-quarters of a circle. Within the outer shell 18 is fitted an inner shell 19 which is also made of resilient sheet metal and rolled-up in such a manner as to be almost completely closed except for a narrow annular slit 21. A helical spring 22 having a circular axis is in turn housed within the inner shell 19.

According to the invention, the sealing device 9 further comprises an auxiliary valve-seat 23. Thus the closure structure 13 of the main valve-seat 11 is permitted by said auxiliary valve-seat to bear against the ring 16 in a direction away from the axis X—X. The substantially toroidal closure structure 13 and the auxiliary valve seat 23 are both mounted within an annular recess 24 formed in the internal face of the ring 16. Said annular recess 24 is provided with a radial face or shoulder 26 which is directed towards the valve body 1 and with a cylindrical face 27 extending from the face 26 to the main valve-seat 11. The auxiliary valve-seat 23 is interposed between the toroidal closure structure 13 of the valve seat 11 and the radial face 26 of the annular recess 24. The auxiliary valve-seat 23 is of the O-ring type and comprises an outer shell 28 which is wholly similar to the inner shell 19 of the main valve-seat 11 except for the fact that the diameter of its profile is close to the diameter of the outer shell 18. Said shell 28 has a convex external surface against which the closure structure 13, more particularly the outer shell 18, is applied and brought to bear on the valve body 1 via the ring 16. The annular slit 21 of the shell 28 is preferably located between that circular generator-line of the shell 28 which is nearest the cylindrical surface 27 and that circular generator-line of the shell 28 which is in contact with the main valve-seat 11.

A helical spring 29 having a circular axis and similar to the spring 22 of the valve seat 11 is housed within the shell 28 of the auxiliary valve-seat 23. The diameter of the turns of said spring is close in value to the diameter of the profile of the inner shell 19 of the valve seat 11.

The seat which has just been described operates as follows:

The flat portion of the anchoring flange 12 serves to secure the main valve-seat 11 to the valve body 1 whilst the curled portion 17 of the flange 12 ensures leak-tightness between the valve body 1 and the ring 16 as well as between the valve body 1 and the main valve-seat 11.

In the closed position, the spherical zone 8 of the valve disk 3 is in contact with the outer shell 18 of the closure structure 13 along a generator-line of said structure which is located between the anchoring flange 12 and the generator-line of contact with the auxiliary valve-seat 23.

When the valve disk 3 is moved back to the closed position, the outer shell 18 of the valve seat 11 tends to roll-up to a further extent as indicated by the arrow F1 in FIG. 2. This produces a slight increase in diameter of the torus formed by the closure structure 13 of the seat 11. In consequence, the spring 22 contained within the toroidal shell is stretched and the slit 21 of the inner shell 19 tends to decrease in width.

Although the invention has no direct bearing on this explanation, it is supposed that the good results obtained by means of the valve seat described in the foregoing arise from the fact that, by coiling-up to a further extent in the direction of the arrow F1, the outer shell 18 rolls without sliding on the outer shell 28 of the auxiliary valve seat 23, thus causing this latter to carry out a movement which tends to reduce the width of the slit 21 in the direction of the arrow F2 of FIG. 2. Thus it is found that the deformation of the main valve-seat 11, which takes place during opening and closing of the valve in the manner described in French Pat. No. 2,331,725, is greatly facilitated.

It is also worthy of note that the presence of the valve seat 23 makes it possible to subject the valve to high pressures (of the order of $45 \times 10^5$ Pa, for example) while preventing any plastic deformation of the main valve-seat 11, this being apparently due to the elastic deformation of the auxiliary valve-seat 23. Thus a valve of this type can subsequently be subjected to low pressures without any attendant hazard of impaired leak-tightness in the closed position. It would further appear that the elasticity of the valve seat 23 compensates for the effects of thermal expansion, thereby maintaining both fluid-tightness and smoothness of operation of the valve, irrespective of the temperature of the fluid which flows through said valve.

Figures 4, 5, 6:
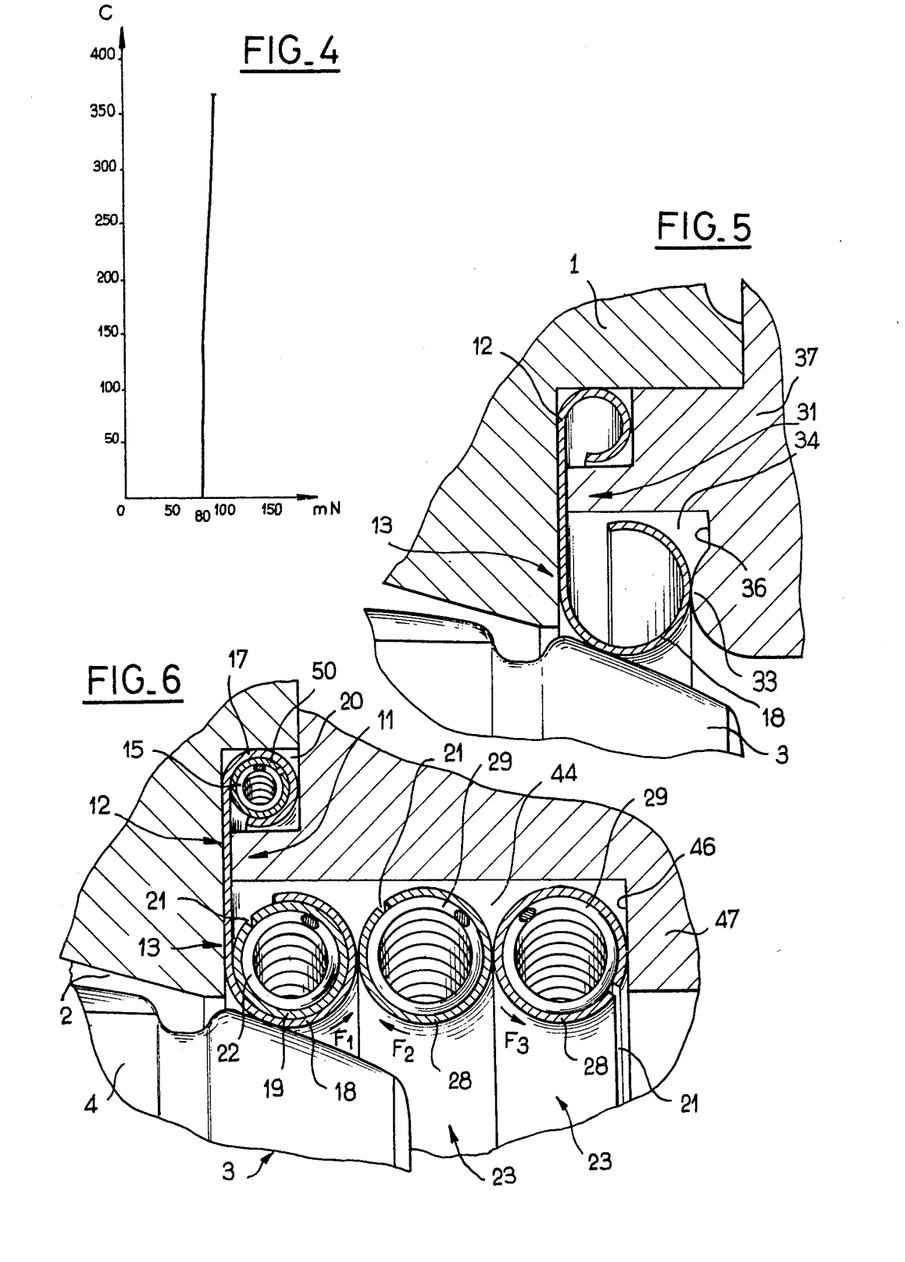
FIG. 4 is a graph in which the progressive variation of the operating torque of the valve disk is indicated as a function of the temperature in the case of the valve of FIGS. 1 and 2.
FIGS. 5 to 14 are views which are similar to FIG. 2 and show different embodiments of the sealing device according to the invention.

The good results achieved by the invention are indicated in the graphs of FIGS. 3 and 4. In FIG. 3, the torque in m·N which is necessary in order to initiate pivotal displacement of the valve disk 3 by producing action on the operating stem 6 (at the end of the closing movement or at the beginning of the opening movement) is plotted as abscissae. The pressure (in Pa $\times 10^5$) of the fluid whose flow rate is controlled by the valve is plotted as ordinates. The curve C1 has been obtained by performing measurements on a valve of the type shown in FIG. 2 in which the passageway 2 has a diameter of 150 mm. The curve C2 relates to a valve of similar type but in which no provision has been made for a valve seat 23 and in which the outer shell 18 of the valve seat 11 is applied directly against a concave annular surface formed in a ring such as the ring 16, in accordance with French Pat. No. 2,331,725.

It appears that, at all pressures, the sealing device according to the invention permits an operating torque which is lower than that obtained in the present state of the art, this value of torque being even reduced approximately by one-half or more in the case of pressures exceeding $45 \times 10^5$ Pa.

In FIG. 4, the torque in m·N, produced when displacing the valve disk by means of the operating stem 6 (either at the end of the closing movement or at the beginning of the opening movement) is plotted as abscissae whilst the temperature in degrees C of the fluid whose flow rate is controlled by the valve is plotted as ordinates.

The curve represented in the graph has been obtained by performing measurements on a valve of the type shown in FIG. 1, in which the passageway 2 had a diameter of 150 mm. This curve shows that the operating torque of the valve disk is substantially constant up to a temperature exceeding 350° C.

The embodiment shown in FIG. 5 is well-suited to valves of small diameter or valves which have to be limited to a low cost price.

This sealing device will be described only in regard to the differences between the device of FIG. 5 and the device of FIG. 2. In this embodiment, provision is made for a main valve-seat 31 having an anchoring flange 12 which is similar to that of FIG. 2 and a closure structure 13 which is similar to the outer shell 18 of the valve seat 2. Moreover, the sealing device 31 comprises an auxiliary valve-seat 33 constituted by an annular rib having a cross-section in the shape of a circle sector. Said rib is provided on the radial face 36 of the annular recess 34 formed in the internal wall of the ring 37 which again performs the same function as the ring 16 of FIG. 2.

The embodiment illustrated in FIG. 6 is, on the contrary, more particularly intended for valves of relatively large diameter or high-quality valves which justify higher cost prices. The main valve-seat 11 is similar to that of FIG. 2 except for the fact that an inner shell 50 is inserted between the curled portion 17 of the anchoring flange 12 and the spring 15. The sealing device comprises two auxiliary valve-seats 23 mounted in series between the closure structure 13 of the main valve seat 11 and the radial face of the annular recess 44 formed in the ring 47; said ring also performs a function which is similar to that of the ring 16 of FIG. 2. The valve seats 23 are similar in design to the valve seat 23 of FIG. 2 whilst the axial dimension of the recess 44 is consequently increased with respect to the axial dimension of the recess 24 of FIG. 2. Preferably, the slit 21 of the outer shell of the valve seat 23 adjacent to the main valve-seat 11 occupies the same position as the slit 21 of FIG. 2 whereas the slit 21 of the other valve seat 23 is located between the circular generator-lines of contact respectively with the first seat 23 and the face 46 on the side nearest the axis of the passageway 2. In the example shown in the figure, the slit 21 of said valve seat 23 is practically in diametrically opposite relation to the slit of the first valve seat 23.

In this sealing device, the rolling-up or coiling of the seat 23 adjacent to the main valve-seat 11 in the direction of the arrow F2 causes the other valve seat 23 to roll-up in the direction of the arrow F3 and has the effect of closing the annular slit 21 of this latter.

In FIGS. 7 to 11, the main valve-seat 31 is similar to the main valve-seat of FIG. 5.

Figure 7:
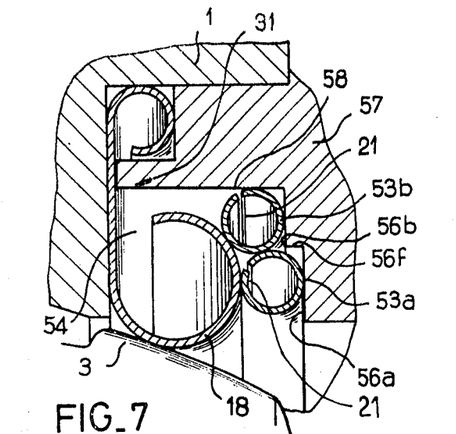

As shown in FIG. 7, the main valve-seat 31 can be brought to bear on the valve body 1 by means of two seats 53a, 53b which are mounted in parallel between the shell 18 and the ring 57 which is screwed in the valve body 1. The valve seats 53a, 53b are similar to the seat 23 except for the fact that they have a smaller cross-sectional diameter and that they do not contain helical springs.

The valve seat 53a has a diameter of torus which is identical with that of the shell 18 of the main valve-seat 31 whereas the other valve seat 53b is of substantially larger diameter, with the result that it is also slightly nearer the axis X—X. The recess 54 of the ring 57 has two radial faces 56a, 56b which are both directed towards the axis X—X and separated by an annular shoulder 56f. Thus the valve seats 53a, 53b which are applied against each other are each interposed between the shell 18 and one of the faces 56a or 56b respectively of the recess 54.

The slit 21 of the valve seat 53a is located between the circular generator-line of contact with the shell 18 and the circular generator-line of contact with the valve seat 53b whereas the slit 21 of the valve seat 53b is located between the generator-line of contact with the shell 18 and the generator-line which is nearest the cylindrical surface 58 of the recess 54.

When the valve disk 3 is moved to the closed position in which it is applied against the shell 18, this latter coils up, thus causing simultaneous coiling-up of the valve seats 53a and 53b, the annular slits 21 of which have a tendency to close.

In this embodiment, the friction forces which are liable to be set up in opposition to coiling-up of the shell 18 are successfully reduced to a considerable extent while ensuring that the valve seat has good stability, thus enhancing its resistance to pressure.

Figure 8:
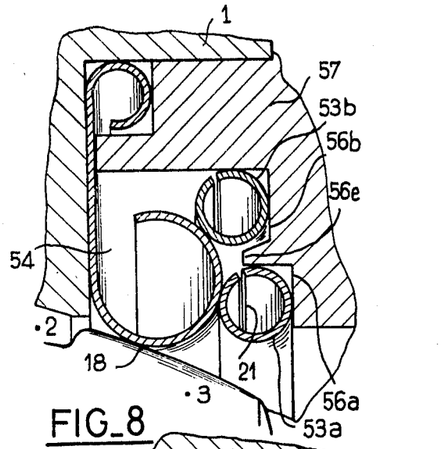

The embodiment of FIG. 8 is similar to that of FIG. 7 except for the fact that the valve seats 53a and 53b are not in contact with each other. In fact, the toroids or "doughnuts" formed by said valve seats have a greater difference in mean diameter than in FIG. 7. Moreover, the radial surfaces 56a and 56b of the recess 54 are separated by a rib 56e which serves to center the valve seat 53a with respect to the axis of the passageway 2. In this example, the slit 21 of the valve seat 53a is located between the annular generator-line of contact with the shell 18 and the generator-line which is located nearest the rib 56e.

Figure 9:
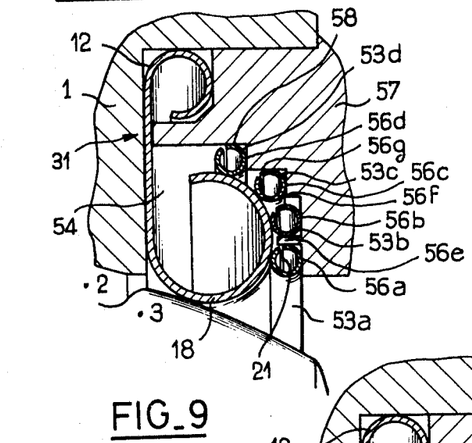

The embodiment of FIG. 9 is more particularly directed to valves in which the flow cross-section has a large diameter of 1 m or more, for example. This exemplified embodiment is similar to that of FIG. 8 except for the fact that four toroidal valve seats 53a, 53b, 53c, 53d are interposed between the shell 18 and the ring 57 which is screwed in the valve body 1.

The valve seats 53a to 53d bear on the ring 57 by means of four radial annular surfaces 56a, 56b, 56c, 56d of the recess 54 which are directed towards the axis X—X. The surfaces 56a and 56b are aligned and separated by a rib 56e which serves to center the valve seat 53a with respect to the axis of the passageway 2. The surfaces 56b, 56c and 56d which are relatively displaced in steps are separated by annular shoulders 56f and 56g which serve respectively to center the valve seats 53b and 53c. The valve seat 53d which has the largest diameter is centered by means of the end wall 58 of the recess 54. The slits 21 of the valve seats 53a to 53d are located between the circular generator-line of contact with the shell 18 and, as the case may be, the rib 56e, the annular shoulders 56f, 56g or the cylindrical surface 58.

Thus, when the shell 18 coils-up under the closing action of the valve disk 3, each valve seat 53a, 53b, 53c or 53d also closes again to a slight extent.

Figure 10:
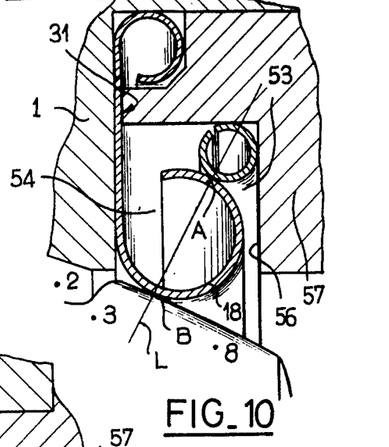

In the example of FIG. 10, the shell 18 of the valve seat 31 is supported by a single seat 53 which is similar to the seat 53a or 53b of FIG. 7. As in the previous FIGS. 7 to 9, said seat 53 is applied against a radial surface 56 of the recess 54.

Furthermore, as shown in cross-section in FIG. 10, the valve seat 53 is mounted in such a manner as to ensure that its point of contact A with the shell 18 is located on the line L perpendicular to the surfaces of the spherical zone 8 and of the shell 18, said perpendicular line being drawn from the point B of contact between these two surfaces.

Figure 11:
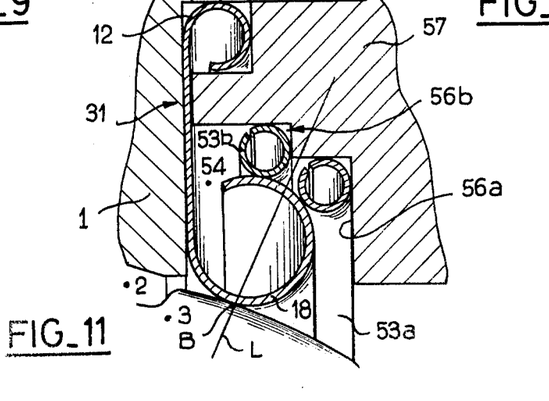

The example of FIG. 11 is very similar to that of FIG. 10 except for the fact that the sealing device comprises in this case two auxiliary valve-seats 53a, 53b located on each side of the line L. Each seat 53a, 53b is applied against the ring 57 which is provided for this purpose with two flat radial surfaces 56a, 56b.

Figure 12:
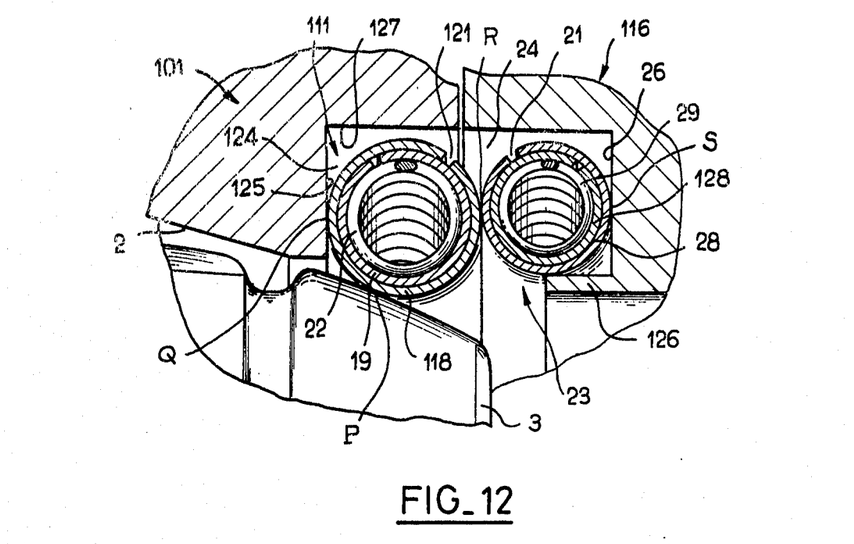

In the example of FIG. 12, the main valve-seat 111 comprises only one closure structure which is similar to that of FIG. 2 except for the fact that the outer shell 118 is substantially toroidal and completely closed with the exception of an annular slit 121. The valve seat 111 is mounted within an annular recess 124 provided in the valve body 101 and forming an extension of the recess 24 of the ring 116. The outer shell 118 is applied in leak-tight manner against the flat radial wall 125 of the recess 124, said wall being located substantially at the end remote from the auxiliary valve seat 23. On the other hand, a space may remain between the shell 118 and the cylindrical wall 127 of the recess 124.

The auxiliary valve-seat 23 is similar to that of FIG. 2 except for the fact that its profile can have a slightly smaller diameter and that an inner shell 128 is interposed between the outer shell 28 and the spring 29.

An annular flange 126 forming a separation between the passageway 2 and the flat face 26 of the recess 24 can serve to provide a reinforcement for maintaining the position-setting of the auxiliary valve-seat 23.

The slit 21 is placed in the same manner as in the embodiment of FIG. 2 and the slit 121 of the valve seat 111 is placed in such a manner as to be substantially symmetrical with the slit 21 with respect to the plane of contact between the valve seats 111 and 23.

Coiling-up of the outer shell 118 which produces a variation in width of the slit 121 in turn causes coiling-up of the outer shell 28 and a reduction in width of the slit 21. The main valve-seat 111 which is applied only against the flat face 125 and the auxiliary valve-seat 23 is self-centered on the valve disk 3 when this latter reaches the closed position, thus reducing any attendant danger of localized leakage to a small portion of the periphery of the valve disk.

In this embodiment, the invention also makes it possible to reduce the operating torque and to increase the sealing performances of the valve. In the case of the valve disk 3, leak-tightness is achieved along the line P of contact between said valve disk 3 and the outer shell 118. In the case of the valve body 101, leak-tightness is achieved along the line Q of contact between said outer shell 118 and the radial face 125 of the recess 124 as well as along the line R of resilient contact between the shells 118 and 28, and along the line S of contact between the shell 28 and the face 29 of the recess 24.

An additional O-ring seal of known type (not shown in the drawings) may also be interposed between the valve body 101 and the ring 116.

Figure 13:
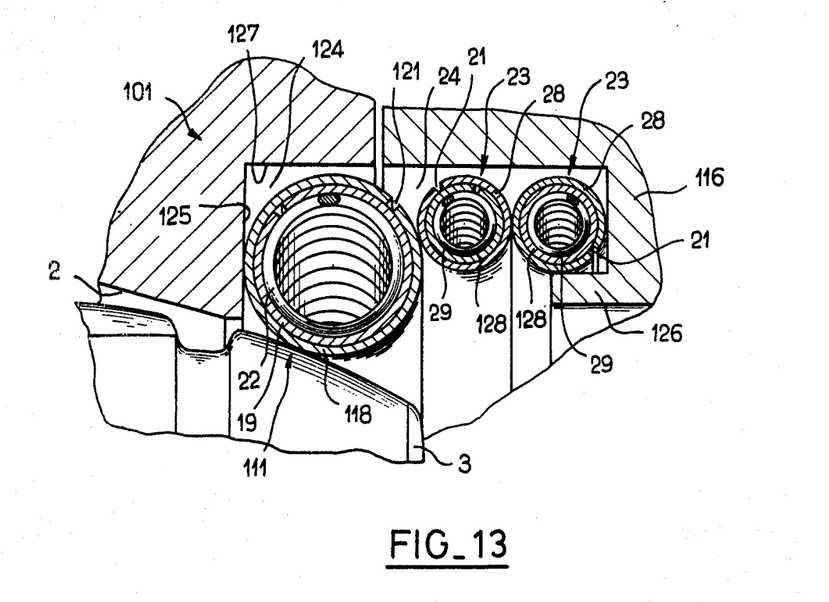

The embodiment of FIG. 13 is similar to that of FIG. 12 except for the fact that the annular recess 24 of the ring 116 contains two auxiliary valve seats 123 which are arranged in the same manner as in the embodiment of FIG. 6.

The embodiment considered with reference to FIG. 13 is more particularly intended for large-diameter and-/or high-quality valves.

Figure 14:
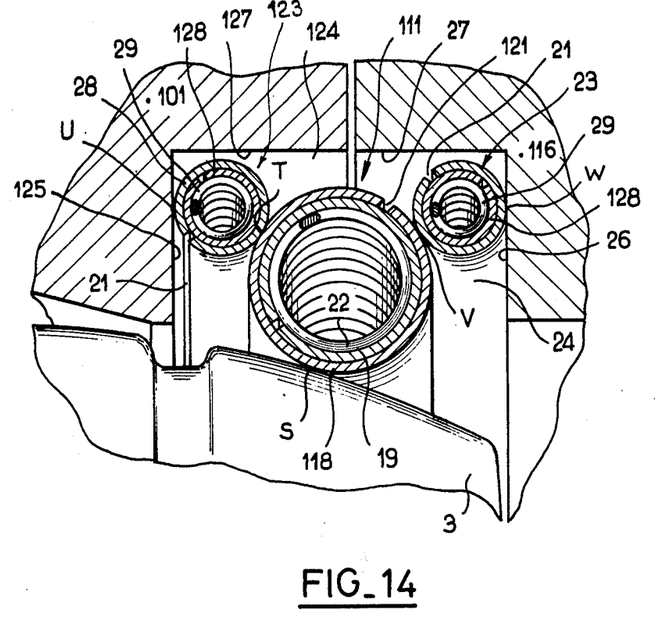

The embodiment of FIG. 14 will be described only in regard to the differences between this latter and the embodiment of FIG. 12.

The auxiliary valve seat 23 has a larger ring diameter and a smaller profile diameter than that of FIG. 12 whilst the cylindrical surfaces 27 and 127 of the recesses 24 and 124 are of larger diameter than those of FIG. 12. Thus the main valve-seat 111 is applied obliquely against the radial wall 26 of the recess 24.

A second auxiliary valve-seat 123 is interposed between the main valve-seat 111 and the radial wall 125 of the recess 124 in symmetrical relation to the valve seat 23 with respect to the plane of the seat 111.

The valve seat 123 is similar to the seat 23 except for the fact that the slit 21 is located on that portion of the outer shell 28 which is directed towards the passageway 2 and extends between the line T of contact with the main valve-seat 111 and the line U of contact with the face 125.

In the closed position of the valve, leak-tightness between the main valve-seat 111 and the valve body 101 is achieved along the lines T and U as well as along the corresponding lines V and W in the case of the valve seat 23. Leak-tightness between the valve seat 111 and the valve disk 3 results from the line of contact S between these two components.

During operation of the valve disk 3, this embodiment of the sealing device also permits coiling and uncoiling of the main valve-seat 111 with low friction.

It is therefore apparent that the invention can be adapted to a wide range of applications. A suitable choice of any one embodiment can be made as a function of the compromise to be reached between the pressure which the valve is capable of withstanding and the desired smoothness of operation of the valve stem 6. Other factors may also be taken into consideration such as cost price or diameter of cross-section provided for the flow of fluid through the valve.

The coiling-up work performed by the valve-closure structure and assisted by the auxiliary valve-seat according to the invention makes it possible to limit the contact pressure, especially between the main valve-seat and the valve disk. The deformations of the main valve-seat and of the auxiliary valve-seat or seats remain elastic, thus endowing the valve with its good resistance to variations in temperature and pressure.

The advantages offered by the invention are surprising since those versed in the art are led to expect that the high contact pressure which arises between two convex surfaces such as those of the closure flange and of the auxiliary valve-seat according to the invention is such as to inhibit the coiling action of the main valve-seat when the valve disk reaches or leaves the closed position and therefore to increase the torque which is necessary in order to operate the valve.

As will readily be apparent, the invention is not limited to the examples described in the foregoing and many arrangements or improvements can be added to these examples without thereby departing either from the scope or the spirit of the invention.

In particular, provision can be made for a helical spring and if necessary for an inner shell in the anchoring flanges, valve-closure structures or auxiliary seals in examples in which these latter comprise only a single shell of curled sheet metal.

Furthermore, the sealing device according to the invention is applicable to any type of valve which can be fitted with a main valve-seat of the type claimed.

What is claimed is:

1. A sealing device for valves in which provision is made for a main metallic valve seat consisting of a resilient annular closure structure having an outer wall of curled sheet metal, said outer wall having an outer face which is intended to be in contact with the valve element when said element is in the closed position, the device being further provided with means for ensuring leak-tightness between the main seat and the valve body, wherein, in order to decrease the torque and to reduce the friction forces generated by rotation of the valve element, said device further comprises at least one auxiliary seat bearing on said outer face of the outer wall and allowing the closure structure of the main seat to bear on the valve body when the valve element is in the closed position, said auxiliary seat being provided with a convex bearing surface for contact with the valve-closure structure and being arranged as a means for guiding the outer wall of the closure structure in a coiling motion thereof.

2. A device according to claim 1, wherein the auxiliary seat is an annular rib formed on an annular shoulder of the passageway for the flow of fluid.

3. A device according to claim 2, wherein the cross-section of said rib is delimited by a circle sector.

4. A device according to claim 1, wherein the auxiliary seat is of the O-ring type and is interposed between the valve-closure structure and a bearing face which is rigidly fixed to the valve body.

5. A device according to claim 4, wherein the auxiliary seat has an outer wall of curled sheet metal which is deformable by means of a resilient coiling action.

6. A device according to claim 5, wherein the two annular edges of the curled metal sheet are separated by an annular slit.

7. A device according to claim 5 or claim 6, wherein a region of said outer wall extending from the line of contact with the main valve-seat up to the edge of the wall in the direction of coiling-up of said wall is free from any contact with the valve body.

8. A device according to claim 4, wherein the auxiliary seat has a ring diameter which is close in value to the diameter of the closure structure of the main seat and a profile having a diameter which is close in value to the profile diameter of said closure structure.

9. A device according to claim 1, wherein the auxiliary seat is so arranged that, in a cross-section taken along a plane passing through the axis of the flow passageway which extends through the valve body, the point of contact of said auxiliary seat with the closure structure is located on the line perpendicular to the surfaces of the closure structure and of the valve element at the point of contact of said structure and said element.

10. A device according to claim 4, wherein a second auxiliary seat is interposed between the first auxiliary seat and the bearing surface which is rigidly fixed to the valve body.

11. A device according to claim 10, wherein the second auxiliary seat has a ring diameter and a transverse-section diameter which are equal to those of the first auxiliary seat.

12. A device according to claim 1, wherein a second auxiliary seat is interposed between the closure structure and a bearing surface which is rigidly fixed to the valve body.

13. A device according to claim 12, wherein the second auxiliary seat is applied against the first auxiliary seat.

14. A device according to claim 12 or claim 13, wherein the two auxiliary seats considered in a sectional view of the device are located on each side of the line perpendicular to the surface of the closure structure and of the valve element at the point of contact of said structure and said element.

15. A device according to claim 1, wherein the main seat is of the O-ring seal type, wherein said main seat is mounted so as to be applied only against the auxiliary seat and against a radial face formed on the valve body at the end remote from said auxiliary seat.

16. A device according to claim 15, wherein the main seat is applied against the radial face of the valve body by means of a second auxiliary seal.

17. A device according to claim 1, wherein a series of auxiliary seats are each interposed between the valve-closure structure and a surface which is rigidly fixed to the valve body.

* * * * *